US006626438B2

(12) United States Patent
Walden

(10) Patent No.: US 6,626,438 B2
(45) Date of Patent: Sep. 30, 2003

(54) SEAL ASSEMBLY FOR TELESCOPIC HYDRAULIC CYLINDER

(75) Inventor: Elond W. Walden, Mantua, NJ (US)

(73) Assignee: HPS, Inc., West Deptford, NJ (US)

( * ) Notice: Subject to any disclaimer, the term of this patent is extended or adjusted under 35 U.S.C. 154(b) by 31 days.

(21) Appl. No.: 09/873,843

(22) Filed: Jun. 4, 2001

(65) Prior Publication Data

US 2003/0160395 A1 Aug. 28, 2003

(51) Int. Cl.[7] .............. F16J 15/18; F16J 15/32; F16J 15/16
(52) U.S. Cl. .......... 277/510; 277/511; 277/530; 277/549; 277/551; 277/584
(58) Field of Search ............... 277/510–511, 529, 277/530, 549, 551, 562, 584

(56) References Cited

U.S. PATENT DOCUMENTS

| | | |
|---|---|---|
| 1,396,714 A | 11/1921 | Carmichael |
| 1,676,391 A | 7/1928 | Humason et al. |
| 2,743,780 A | 5/1956 | Brown |
| 2,815,973 A * | 12/1957 | Jackson .................... 277/572 |
| 2,857,972 A | 10/1958 | Baker |
| 2,934,363 A * | 4/1960 | Knox ...................... 277/436 |
| 3,136,221 A * | 6/1964 | Walker ..................... 91/168 |
| 3,339,932 A | 9/1967 | Maha |
| 3,554,563 A * | 1/1971 | Schumacher et al. ....... 277/530 |
| 3,848,880 A | 11/1974 | Tanner |
| 4,040,636 A * | 8/1977 | Albertson et al. .......... 277/562 |
| 4,053,166 A | 10/1977 | Domkowski |
| 4,288,082 A | 9/1981 | Setterberg, Jr. |
| 4,406,469 A | 9/1983 | Allison |
| 4,417,503 A * | 11/1983 | Izumi ..................... 277/436 |
| 4,428,590 A * | 1/1984 | Pippert et al. ............. 277/638 |
| 4,433,847 A | 2/1984 | Weinberg |
| 4,438,935 A | 3/1984 | Lees |
| 4,473,231 A | 9/1984 | Tilton et al. |
| 4,588,030 A | 5/1986 | Blizzard |
| 4,635,945 A | 1/1987 | Beck |
| 4,721,314 A | 1/1988 | Kanayama et al. |
| 4,811,959 A | 3/1989 | Bullard et al. |
| 4,892,417 A * | 1/1990 | Spargo et al. ............... 384/99 |
| 4,893,823 A | 1/1990 | Strouse et al. |
| 4,945,724 A | 8/1990 | O'Neal |
| 5,173,035 A | 12/1992 | Mukumoto et al. |
| 5,205,568 A * | 4/1993 | Stoll et al. .................. 277/615 |
| 5,297,805 A | 3/1994 | Merkin et al. |
| 5,309,993 A | 5/1994 | Coon et al. |
| 5,346,230 A | 9/1994 | Schumacher et al. |
| 5,377,999 A | 1/1995 | Gorman |
| 5,577,737 A | 11/1996 | Lacy |
| 5,833,245 A * | 11/1998 | Gallagher .................. 277/549 |
| 5,879,010 A | 3/1999 | Nikanth et al. |
| 6,050,572 A | 4/2000 | Balsells et al. |
| 6,076,645 A | 6/2000 | Winkelmann et al. |
| 6,209,882 B1 * | 4/2001 | Riess ....................... 277/562 |
| 6,386,548 B1 * | 5/2002 | Grimanis et al. ........... 277/436 |

FOREIGN PATENT DOCUMENTS

GB 2072798 A * 10/1981

* cited by examiner

Primary Examiner—Chuck Y. Mah
Assistant Examiner—Vishal Patel
(74) Attorney, Agent, or Firm—Hooker & Habib, P.C.

(57) ABSTRACT

A multi-tube hydraulic cylinder includes annular seal assemblies joining adjacent tubes. Each assembly includes an annular primary seal member and an annular base seal member. The primary seal member is formed from relatively soft elastomer and includes inner and outer seal ribs which engage the bottom of a seal groove and the surface of an adjacent tube. The primary seal member is mounted on the base seal member, is formed from an elastomer harder than the material in the primary seal member, and includes inner and outer seal ribs and a heel facing outwardly of the seal groove on the end of the base member away from the seal ribs. The base member has an axial length greater than its radial thickness. When the seal assembly is compressed between the two tubes the seal ribs of the two members provide low pressure and high pressure seals for confining hydraulic fluid in the chamber. The heel is biased into the base member and holds the member in the groove to prevent rotation due to frictional engagement with the other tube during relative movement of the tubes.

18 Claims, 3 Drawing Sheets

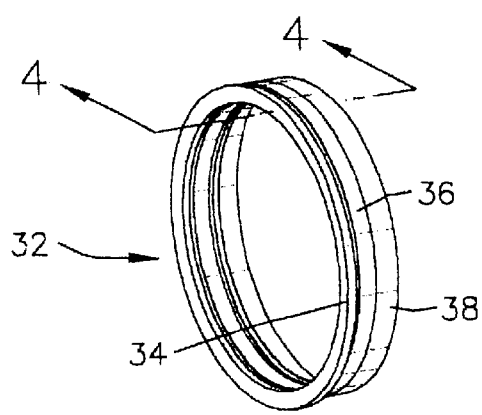
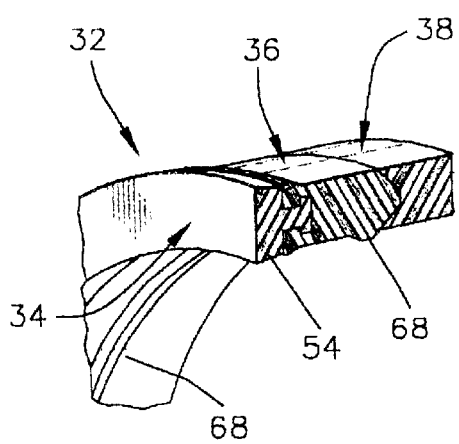
Fig. 3    Fig. 4
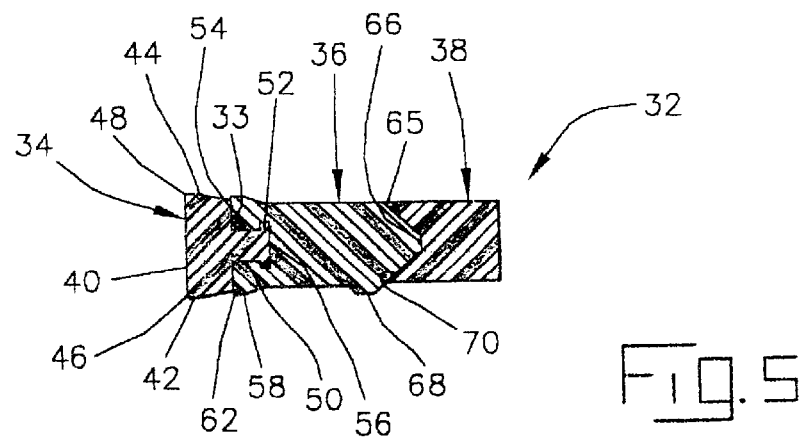
Fig. 5
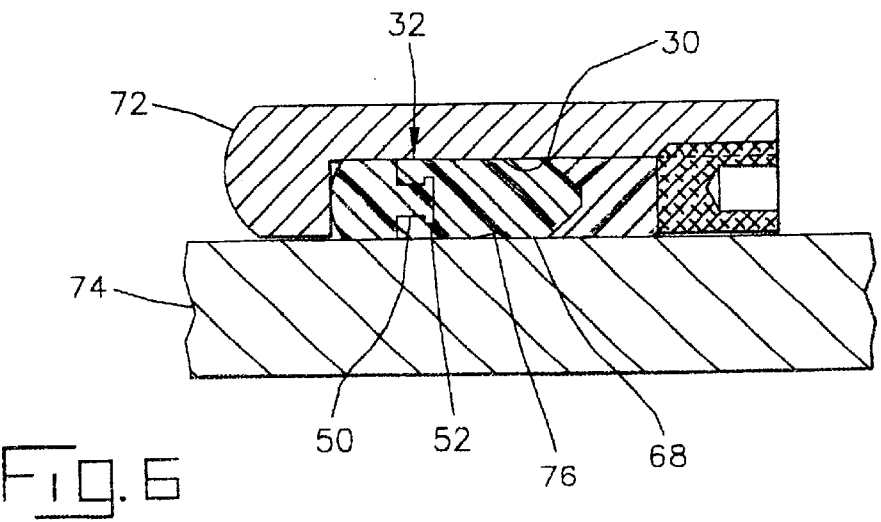
Fig. 6

SEAL ASSEMBLY FOR TELESCOPIC HYDRAULIC CYLINDER

FIELD OF THE INVENTION

The invention relates to annular seal assemblies used for preventing leakage in hydraulically extended and retracted multi-staging cylinders.

DESCRIPTION OF THE PRIOR ART

Hydraulic cylinders having a number of nested thin wall tubes with annular seals between the tubes are well known. The cylinders define an interior hydraulic fluid chamber which is connected to a source of hydraulic fluid so that flow of fluid into the chamber extends the cylinder and exhausting of fluid from the chamber allows retraction of the cylinder tubes.

Annular seal assemblies are conventionally provided between adjacent tubes in the cylinder. These seal assemblies must maintain a reliable hydraulic seal between the outer surface of the inner tube and the inner surface of the outer tube, despite changes in the pressure of the hydraulic fluid and relative movement of the tubes. Disassembly of the cylinders to replace failed seal assemblies is difficult and time consuming. For this reason, it is desirable that the seals have a long useful working life.

Conventional seals for thin wall hydraulic cylinder tubes have an unsatisfactory short useful life. During useful life, the sealing surfaces are moved axially along the tubes as the cylinder is extended and retracted. When the cylinder tubes move under high hydraulic pressure the seals are subjected to wear which, in time, degrades the efficiency of the seals. Further, thin wall multi-tube cylinders are flexed by side loads and can leak because the conventional seals are insufficiently compliant to maintain a seal between flexed cylinder tubes.

Also, conventional seal assemblies include annular sealing members confined in seal grooves with outer and inner surfaces engaging adjacent tubes. When the tubes are moved axially relative to each other, particularly when the hydraulic fluid in the cylinder is under high pressure, there is a considerable frictional force exerted on the sealing member by the moving tube. This force can roll the sealing member in the seal groove and destroy the ability of the member to maintain a hydraulic seal between the cylinders. In this event, the seal fails and must be replaced.

Accordingly, there is a need for an improved seal assembly for maintaining both low pressure and high pressure seals between tubes of a multi-tube hydraulic cylinder. The seal assembly should have a long useful life and the ability to maintain the seal despite increase of the gap between the cylinder tubes due to lateral loading of the cylinder. The seal should also prevent rolling of sealing members due to frictional forces generated by relative movement of the tubes.

SUMMARY OF THE INVENTION

The invention is an improved annular seal assembly including an annular primary seal member and an annular base seal member. The primary seal member is formed from relatively soft elastomer material and includes inner and outer radial pressure ribs which engage the bottom of the seal recess and the wall of an adjacent tube to form a low pressure seal. The ribs are pressure biased against the surfaces to improve the seal as hydraulic fluid pressure increases. The primary seal member between the ribs is exposed to the hydraulic fluid chamber so that pressure of the fluid biases the ribs against the adjacent walls. The primary seal member is mounted on the base seal member so that as pressure of the hydraulic fluid increases the fluid biases a second set of seal ribs on the base seal member against the adjacent walls to establish a high pressure seal. The base seal member is made from elastomer material harder than the material used in the primary seal member.

The base seal member has an axial length approximately twice its radial width and a heel located away from the pressure fluid and facing the adjacent tube. The heel is compressed into the base seal member to squeeze the outer end of the base seal member between the two surfaces and hold this end in place to prevent rolling of the base member in the seal groove when the tubes are moved along each other.

The primary and base seal members assure that reliable pressure seals are maintained as pressure in the cylinder increases from relatively low pressure, which is sealed by the primary seal member, to higher pressure which is sealed by the base seal member. The seal length of the base seal member, the heel at the outer end of the base seal member and the mechanical connection between the base seal member and a tube bearing member cooperate to prevent rolling of the base member in the seal groove.

The seal assembly holds the base seal member in proper orientation within the seal groove to assure a long useful life. Additionally, the seal assembly has sufficient radial compliance to maintain a seal between the adjacent walls of the seal groove and adjacent tube, despite increasing of the gap between these walls due to ovalization of the tubes. Ovalization occurs when a lateral load is applied to the end of the cylinder and tends to rotate one tube relative to another tube at the seal assembly.

Other objects and features of the invention will become apparent as the description proceeds, especially when taken in conjunction with the accompanying drawings illustrating the invention, of which there are three sheets and three embodiments.

DESCRIPTION OF THE DRAWINGS

FIG. 3 is an isometric view of a seal assembly with circumferentially stressed seal members according to the invention;

FIG. 4 is a sectional view taken along line 4—4 of FIG. 3;

FIG. 5 is a sectional view of a circumferentially stressed seal;

FIG. 6 is a sectional view showing the seal assembly engaging inner and outer tubes in the cylinder of FIG. 1;

DESCRIPTION OF THE PREFERRED EMBODIMENT

Figure 1:
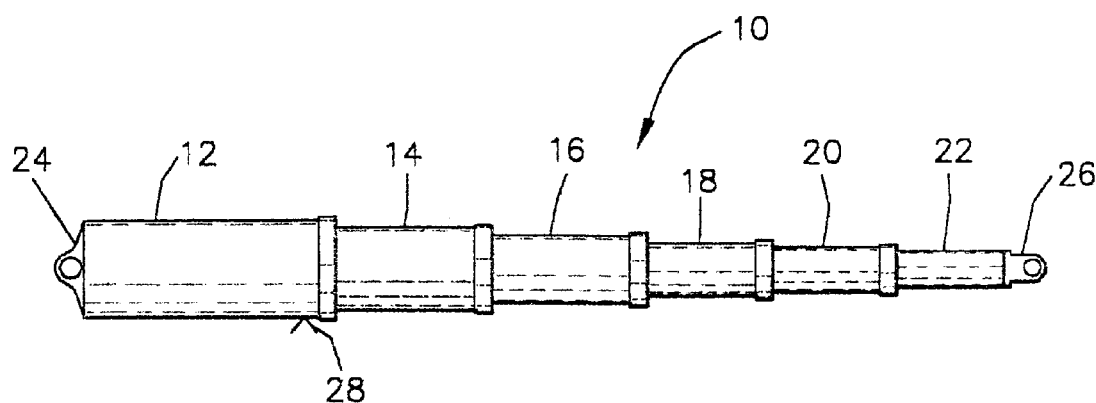
FIG. 1 is a side view of an extended hydraulic cylinder according to the invention.

FIG. 1 illustrates an extended multi-segment telescopic hydraulic cylinder 10 having a plurality of nested thin wall extension tubes 12, 14, 16, 18, 20 and 22. Base tube 12 has the largest diameter and the tubes extending outwardly from the base tube have decreasing diameters so that when the cylinder is collapsed the tubes nest in tube 12. The interiors of tubes 12–20 form a single hydraulic fluid chamber which is connected to a source of pressurized hydraulic fluid. Flow of hydraulic fluid into the chamber extends cylinder 10. Withdrawal of hydraulic fluid from the chamber retracts the cylinder to the collapsed position with tubes 14–22 nested in tube 12. Mounting plate 24 is provided on the end of tube 12 away from the remaining tubes and mounting plate 26 is provided on the end of tube 22 away from the remaining tubes. Plate 24 is conventionally attached to a support for the cylinder. The end of tube 12 may engage support 28 to permit extension of cylinder 10 as a cantilever to support a load on plate 26.

Figure 2:
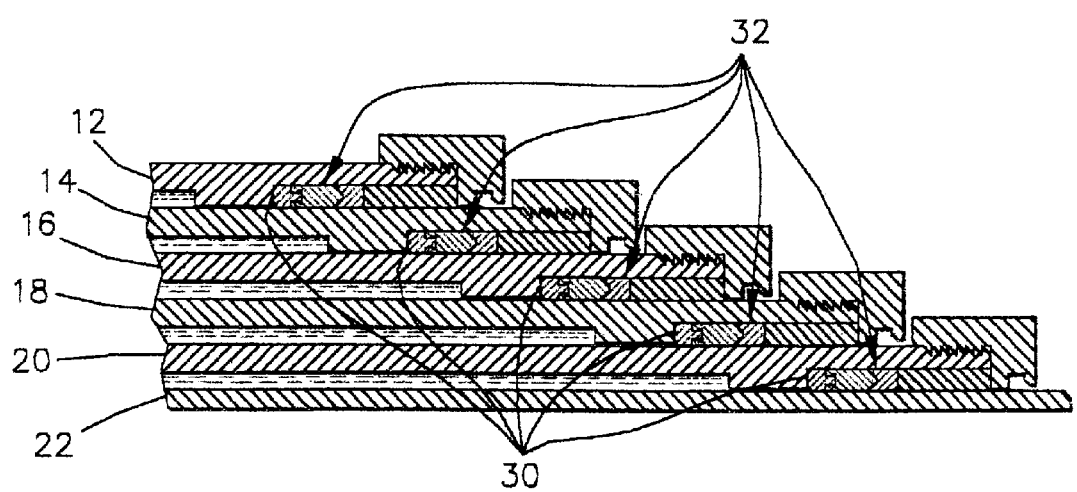
FIG. 2 is a sectional view taken through portions of the top of the cylinder of FIG. 1, when retracted.

An inwardly facing annular seal groove 30 is formed in the interior wall of the outer end of each tube 12–20, as shown in FIG. 2. An annular three element seal assembly 32 is fitted in each groove 30 and sealingly engages the outer circumference of an adjacent inner tube while permitting relative axial movement of the tubes.

Each seal assembly 32 includes an annular primary seal member 34, an annular base seal member 36 and an annular tube bearing member 38. Assembly 32, with circumferentially compressed primary and base members, is shown in FIGS. 3, 4 and 5, without radial compression of the members.

Primary seal member 34 is located adjacent the hydraulic fluid chamber and includes a flat end face 40 which is exposed to pressurized hydraulic fluid in the chamber. Inner and outer annular sidewalls 42 and 44 slope from inner axial end or face 40 toward each other and toward base member 36 to reduce the radial dimension of member 34 away from face 40. The side walls define inner and outer seal ribs 46 and 48. Annular mounting rib 50 extends from the outer axial end 33 of member 34, away from face 40, and includes an enlarged head 52. Seal member 34 is preferably formed from a relatively soft, internally lubricated elastomer such as a Nitrile plastic and may have a durometer hardness of about 70 to 90 on the Shore A scale.

The base seal member 36 includes a flat, annular end face 54 abutting the pressure seal member 34 away from face 40. T-shaped groove 56 is formed in face 54 and receives annular rib 50 and head 52 of the pressure seal member 34 to join members 34 and 36 mechanically. Tapered radial inner and outer sides 58 and 60 define inner and outer seal ribs 62 and 64. As shown in FIG. 5, the uncompressed radial distance between ribs 46 and 48 of seal member 44 is greater than the radial distance between ribs 62 and 64 of member 36.

Member 36 has an annular V-shaped projection 66 on the outer end 65 opposite from face 54. The axial length of member 36, between face 54 and projection 66, is about twice the radial thickness of the member. A stabilization and wear heel 68 extends radially inwardly from the inner side of the member, adjacent projection 66. Base seal member 36 is preferably formed from a stiffly flexible plastic material and is harder than pressure seal member 34. Member 36 may be formed from a urethane plastic having a durometer hardness of about 50 to 65 on the Shore D scale.

Annular tube bearing member 38 is fitted in the outer portion of seal groove 30 and has the same thickness as member 36. An annular V-shaped retention groove 70 is formed on the inner side of member 38 adjacent member 36 and is complimentary with projection 66 and engages the projection to form a mechanical connection between members 32 and 36. The connection aids in preventing rotation of member 36 when the tubes move axially. If desired, member 36 may have an annular groove and member 38 may have a complimentary annular projection. Other suitable connections between the members may be used. Member 38 is formed from a tough and wear resistant plastic, such as nylon, and may include a mineral filler, such as glass fibers, to improve wear resistance.

Different size annular seal assemblies 32 are fitted in the seal grooves of the different diameter tubes 12–20. The outer diameters of the annular seal member and base seal member in each assembly are greater than the diameter of groove 30 receiving the assembly. The outer diameter of the tube bearing member 38 is equal to the outer diameter of the groove 30 receiving the tube bearing member. The members 34 and 36 are peripherally squeezed or compressed when fitted into a groove to stress the elastomers, store energy in the two members 34 and 36 and compress the radial outer surfaces of members 34 and 36 tightly against the bottom of the seal groove.

After a seal assembly has been fitted in a seal groove, the next innermost tube is fitted into the tube carrying the assembly as shown in FIG. 6. Assembly 32 is mounted in a seal groove 30 in outer tube 72 and engages the outer surface of inner tube 74. In this position, before pressurization of the hydraulic fluid chamber, the prestressed elastomer members 34 and 36 are compressed tightly between the bottom of groove 30 and tube 74. The inner and outer seal ribs 46 and 48 of member 34 are compressed flat into the member by engagement with, respectively, the outer surface of tube 74 and the bottom of groove 30. Likewise, the inner and outer seal ribs 62 and 64 of member 36 are compressed flat into the member by pressure engagement with, respectively, the outer surface of tube 72 and the bottom of groove 30. Face 40 is bowed outwardly. Heel 68 engages the outer surface of tube 74 and is compressed into the outer portion of prestressed base seal member 36 to provide high pressure engagement with the tube and an annular depression 76 on the inner side of member 36 adjacent the heel.

Each seal assembly 32 forms an effective hydraulic seal between two adjacent tubes. When the hydraulic fluid in the interior of cylinder 10 is relatively low the fluid pressurizes surface 40 of the primary seal member to deform the primary seal member inwardly and bias the inner and outer annular seal ribs 46 and 48 against the inner tube and bottom of the seal groove respectively and form a pressure seal between the tubes sufficient to prevent leaks while permitting relative axial movement of the tubes. When the pressure of the hydraulic fluid in the interior chamber is increased to a high level, which could leak past the primary seal members, the primary seal member is pressurized into recess 56 and biases ribs 62 and 64 of the base seal member outwardly to form an effective high pressure seal between the tubes to prevent leaks while permitting relative movement of the tubes.

Rolling of seal members in seal grooves occurs because of torque exerted on the members by frictional engagement with moving tubes. When tubes 72 and 74 are moved axially relative to each other the high pressure loading on the trailing end of stiffly flexible base member 36 exerts a friction induced torque on the member tending to rotate the member in groove 30. For instance, when tube 74 shown in FIG. 6 is moved to the right relative to tube 72 pressure engagement between the compressed seal rib 62 and tube 64 exerts a friction induced torque on member 36 tending to rotate the member counterclockwise in groove 30. Likewise, when tube 74 is moved to the left relative to tube 72 the high pressure engagement between compressed heel 68 and tube 74 exerts a friction induced torque which tends to rotate the central member 36 clockwise in groove 30.

Rotation of base member 36 is prevented because the axial length of the member is approximately twice the radial width of the member, making rotation difficult; the high pressure engagement between seal rib 62 and inner tube 74 on one end of the member and, the high pressure engagement between heel 68 and tube 74 on the other end of the member; and the mechanical confinement of projection 66 in V-recess 70 of rigid tube bearing member 38. Rotation of member 36 is prevented even though the member is exposed to a very high hydraulic pressure within the inner chamber in cylinder 10 and high frictional forces.

Hydraulic cylinder 10 may be subjected to side loading, for instance, when the extended cylinder is mounted on plate 24 and support 28 with a load suspended from plate 26 on the free end of the cylinder. The load on plate 26 bends the outer end of the cylinder down and flexes and ovalizes the thin walls of the tubes, particularly at the junctions between the outer end of a larger tube and the inner of a surrounded, smaller tube.

Bend ovalization tends to decrease the gap between the tubes at the top of the cylinder and increase the gap between the tubes at the bottom of the cylinder. The gap at the top of the cylinder is not appreciably reduced because the tube bearing member 38 is sandwiched between the tubes.

The prestressed elastomers in the primary and base seal members 34 and 36 have sufficient compliance to maintain sealing engagement between the bottom of seal groove and the adjacent surface of the surrounded tube 74 to maintain a pressure seal between the tubes despite ovalization due to side loading, even during extension and retraction of the tubes.

Figure 7:
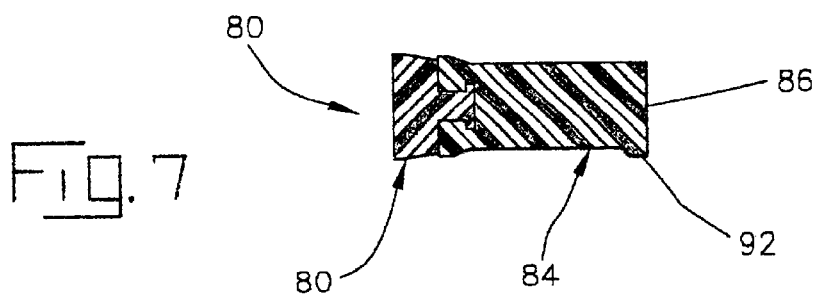
FIGS. 7 and 8 are similar to FIGS. 5 and 6 and illustrate a second embodiment of the invention.

FIG. 7 illustrates a second embodiment two element seal assembly 80 having an annular primary seal member 82 and an annular base seal member 84. The assembly may be used to replace assembly 32. Primary seal member 80 is identical to primary seal member 34, previously described. Base seal member 84 is identical to base seal member 36, previously described, with the exception that the member has a flat outer face 86 instead of the projection 66 of member 34. The members are peripherally squeezed into the groove. The members form low and high pressure seals as described and are compliant to prevent leaks due to ovalizing of the tubes. The axial width of the primary seal and heel 92 prevent rotation in the groove.

Figure 8:
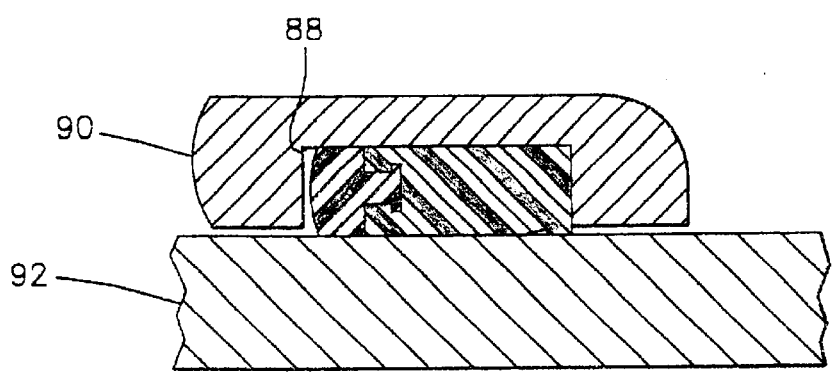

FIG. 8 shows assembly 80 positioned in seal groove 88 in outer thin wall tube 90 and in engagement with the outer surface of inner thin wall tube 92. Members 82 and 84 have an uncompressed diameter greater than the diameter of groove 88 and are squeezed in groove 88, as previously described. The elastomers are circumferentially stressed. A low pressure seal is formed between the bottom of the groove and the surface of tube 92 by the compressed seal ribs 46 and 48. Heel 92 of member 84 is compressed into the member as shown to form a high pressure connection between the outer end of member 84 and groove 88 and the outer wall of tube 92.

Member 84 has an axial length approximately twice the radial thickness of the member. The length of member 84 and the high pressure engagements between the ribs and heel and tube 92 cooperate to prevent rotation of the member in groove 88 during movement of tube 92, as previously described.

Figure 9:
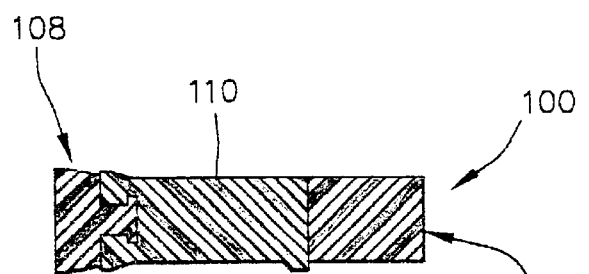
FIGS. 9 and 10 are similar to FIGS. 5 and 6 and illustrate a third embodiment of the invention.
Figure 10:
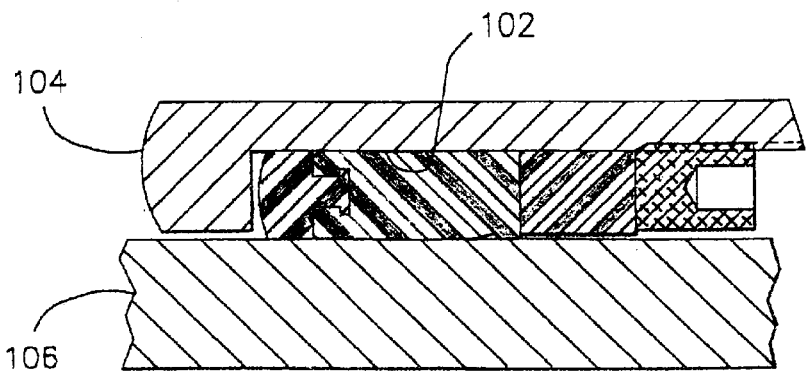

FIGS. 9 and 10 illustrate a third embodiment three element seal assembly 100 which is fitted in seal groove 102 of outer tube 104 and engages the outer surface of inner tube 106.

Assembly 100 includes primary pressure seal member 108, identical to member 34 previously described, and annular base seal member 110, identical to annual base seal member 36, previously described, and a rectangular cross section annular tube bearing member 112. Member 112 is formed of the same high wear material as member 38. Assembly 100 forms low pressure and high pressure seals between the tubes. Member 110 is held against rotation by relative movement of tube 106.

Seal assemblies 32, 80 and 100 are all fitted in annular inwardly facing seal grooves formed in the inner surface of a tube in order to seal against the outer surface of a second tube inserted into the first tube. The primary and base seal members have uncompressed diameters greater than the diameter of the groove and are peripherally squeezed when fitted into the groove in order to prestress the elastomers and form desired seals between the bottom of the groove and the outer surface of the inner tube.

The invention is not limited to seal assemblies which are fitted in inwardly facing seal grooves for engaging smaller diameter tubes. The invention also includes like seal assemblies which are fitted into seal grooves in the outer surface of the inner tube to form seals between the bottom of this outwardly facing seal groove and the inner surface of a surrounding outer tube. The primary and base seal members in these assemblies have uncompressed inner diameters less than the diameter of the outwardly facing seal recess and are enlarged, fitted over the outer end of the tube carrying the recess and then snapped into the recess under tension. This prestressing of the elastomers helps form desired seals between the seal members and the bottom of the groove. The seal assemblies fitted into outwardly facing seal grooves are identical to the disclosed seal assemblies 32, 80 and 100, with the exception that the heels on the base seal members face radially outwardly, not inwardly. For instance FIGS. 6, 8 and 10 are identical to corresponding cross sectional views of an outwardly facing assembly in a smaller tube surrounded by a larger tube. Seal assemblies in outwardly facing grooves operate identically to the disclosed seals with the prestressed elastomer in the primary seal member providing a low pressure seal between the tubes and the prestressed elastomer in the secondary seal member providing high pressure seals between the tubes. The axial length of the base seal member, the compressed heels and the mechanical joints between the base seal members and a tube bearing member, if provided, cooperate to prevent rotation of the base seal member in the groove.

While I have illustrated and described preferred embodiments of my invention, it is understood that this is capable of modification, and I therefore do not wish to be limited to the precise details set forth, but desire to avail myself of such changes and alterations as fall within the purview of the following claims.

What I claim as my invention:

1. A seal assembly for a telescopic hydraulic cylinder of the type having two cylindrical members fitted one inside the other, a seal groove in one member facing the other member, and a pressure chamber located adjacent on the inner side of the seal groove, said assembly fitted within the seal groove and comprising an annular primary seal member having inner and outer radial side walls and opposed axially spaced inner and outer ends, a first seal rib on each radial side of the primary seal member adjacent the inner end thereof, and a convex annular member extending outwardly from the outer end of the primary seal member; and an annular base seal member located in said seal groove adjacent the outer end of said primary seal member, the base seal member having inner and outer radial side walls, inner and outer axial ends, an annular concave opening in the inner end thereof, a second seal rib on each radial side of the base seal member adjacent the inner end thereof, and a heel located adjacent the outer end of the base seal member spaced axially away from the seal ribs thereof, the base seal member having an axial length about twice the radial thickness of the base seal member, said heel and said first and second ribs extending outwardly from said members when not compressed, said convex member fitted in said concave member, said primary seal member and base seal member each formed from a pressure-deformable elastomer, the hardness of said base seal member elastomer being greater than the hardness of said primary seal member elastomer; and an annular tube bearing member located in said seal groove outwardly from said base seal member, said bearing member engaging the outer end of the base seal member, wherein the seal ribs in said primary and base seal members engage said cylindrical members and are compressed into the primary and base members, the heel engages one of the said two cylindrical members and is compressed into the base seal member so that pressurization of fluid in the chamber pressure-biases the seal ribs against the bottom of the seal groove and against the surface of said one of the said two cylindrical members and the heel is compressed into the base seal member to prevent rolling of the base seal member in the seal groove during relative movement of the cylindrical members.

2. The seal assembly as in claim 1 wherein the primary seal member and the base seal member are circumferentially compressed and fitted in said seal groove, and said seal groove is formed in an interior wall of a cylindrical member.

3. The seal assembly as in claim 1 wherein the base seal member and the primary seal member are circumferentially stretched and are fitted in said seal groove, and said seal groove is formed in an outer wall of a cylindrical member.

4. The seal assembly as in claim 1 wherein the primary seal member has a durometer hardness of about 70 to 90 on the Shore A scale and the base seal member has a durometer hardness of about 50 to 65 on the Shore D scale.

5. The seal assembly as in claim 1 wherein the bearing member includes a first anti-rotation member on the inner end thereof, the base seal member having a second anti-rotation member on the outer end thereof, said anti-rotation members engaging each other so that the tube bearing member assists in preventing rolling of the base seal member in the seal groove.

6. The seal assembly as in claim 5 wherein said anti-rotation members include an annular rib fitted in an annular recess.

7. The seal assembly as in claim 6 wherein the rib and recess are both V-shaped.

8. The seal assembly as in claim 6 wherein the first anti-rotation member is an annular recess.

9. A seal assembly for a telescopic hydraulic cylinder of the type having two cylindrical members fitted one inside the other, a seal groove in one member facing the other member, and a pressure chamber located adjacent to the inner side of the seal groove, said assembly fitted within the seal groove and comprising an annular primary seal member having inner and outer radial side walls and opposed axially spaced inner and outer ends, a first seal rib on each radial side of the primary seal member adjacent the inner end thereof, and a convex annular member on the outer end of the primary seal member; and an annular base seal member located in said seal groove adjacent the outer end of said primary seal member, the base seal member having inner and outer radial side walls, inner and outer ends, an annular concave opening in the inner end thereof, and a second seal rib on each radial side of the base seal member each adjacent the inner end thereof; and means for preventing rolling of the base seal member in the groove during relative movement of the cylindrical memders; said primary seal member and base seal member each formed from pressure-deformable elastomer, the hardness of said base seal member elastomer being greater than the hardness of said primary seal member elastomer; and an annular tube bearing member located in said groove outwardly from the base seal member, the bearing member engaging the outer end of the base seal member.

10. The seal assembly as in claim 9 wherein said means comprises an integral portion of said base seal member.

11. The seal assembly as in claim 10 wherein the thickness of the base seal member at said means when the elastomer in the base seal member is uncompressed is greater than the distance between the bottom of the seal groove and the other cylindrical member so that the base seal member at said means is compressed.

12. The seal assembly as in claim 11 wherein said primary seal member is compressed between said cylindrical members.

13. The seal assembly as in claim 12 wherein said means comprises a heel.

14. The seal assembly as in claim 13 wherein said heel engages the other cylindrical member.

15. The seal assembly as in claim 9 wherein the primary seal member has a durometer hardness of about 70 to 80 on the Shore A scale and the base seal member had a durometer hardness of about 50 to 65 on the Shore D scale.

16. The seal assembly as in claim 9 wherein the primary seal member and the base seal member are circumferentially compressed and fitted in said seal groove, and said seal groove is formed in an interior wall of a cylindrical member.

17. The seal assembly as in claim 9 wherein the base seal member and the primary seal member are circumferentially stretched and are fitted in said seal groove, and said seal groove is formed in an outer wall of a cylindrical member.

18. The seal assembly as in claim 9 wherein the bearing member includes a first anti-rotation member on the inner end thereof, the base seal member having a second anti-rotation member on the outer end thereof, said anti-rotation members engaging each other so that the tube beating member assists in preventing rolling of the base seal member in the seal groove, said anti-rotation members including an annular rib fitted in an annular recess.

* * * * *

UNITED STATES PATENT AND TRADEMARK OFFICE
CERTIFICATE OF CORRECTION

PATENT NO.   : 6,626,438 B2                                       Page 1 of 1
DATED        : September 30, 2003
INVENTOR(S)  : Elond W. Walden It is certified that error appears in the above-identified patent and that said Letters Patent is hereby corrected as shown below:

Column 6,
Line 58, replace "on" with -- to --.

Column 8,
Line 9, insert -- axial -- between "outer" and "ends".
Line 13, insert -- seal -- between "the" and "groove".
Line 14, replace "memders" with -- members --.
Line 15, insert -- a -- between "from" and "pressure".

Signed and Sealed this

Thirteenth Day of January, 2004

JON W. DUDAS
*Acting Director of the United States Patent and Trademark Office*